United States Patent
Agassy et al.

(10) Patent No.: US 9,830,497 B2
(45) Date of Patent: Nov. 28, 2017

(54) CORRECTION OF DIFFRACTION EFFECTS IN AN ULTRASONIC SENSOR

(71) Applicant: QUALCOMM Incorporated, San Diego, CA (US)

(72) Inventors: Meir Agassy, Ramat Gan (IL); Gal Rotem, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/198,686

(22) Filed: Jun. 30, 2016

(65) Prior Publication Data

US 2017/0004347 A1 Jan. 5, 2017

Related U.S. Application Data

(60) Provisional application No. 62/188,706, filed on Jul. 5, 2015.

(51) Int. Cl.
*G06K 9/00* (2006.01)

(52) U.S. Cl.
CPC ....... *G06K 9/00067* (2013.01); *G06K 9/0002* (2013.01); *G06K 9/00087* (2013.01)

(58) Field of Classification Search
None
See application file for complete search history.

(56) References Cited

U.S. PATENT DOCUMENTS 9,013,451 B1  4/2015  Schneider et al.

OTHER PUBLICATIONS

International Search Report and Written Opinion—PCT/US2016/040749—ISA/EPO—dated Sep. 19, 2016.
Izzetoglu M., et al., "Wavelet Domain Least Squares Deconvolution for Ultrasonic Backscattered Signals", Proceedings of the 22nd Annual International Conference of the Engineering in Medicine and Biology Society, IEEE, Jul. 23-28, 2000, Piscataway, NJ, USA, IEEE, vol. 1, Jul. 23, 2000 (Jul. 23, 2000), pp. 321-324, XP010530281, ISBN: 978-0-7803-6465-3.

(Continued)

*Primary Examiner* — Delomia L Gilliard
(74) *Attorney, Agent, or Firm* — Silicon Valley Patent Group LLP

(57) ABSTRACT

Embodiments of correcting diffraction effects in an ultrasonic sensor are disclosed. In one embodiment, an ultrasonic sensor may include an ultrasonic transmitter configured to transmit an ultrasonic wave, a piezoelectric receiver layer configured to receive a reflected wave of the ultrasonic wave, where the reflected wave comprises a plurality of images of a fingerprint having a plurality of phases in a time sequence, and a platen layer configured to protect the ultrasonic transmitter and the piezoelectric receiver layer. The ultrasonic sensor may further include an ultrasonic sensor array and a processor configured to sum the plurality of images multiplied by a complex phase exponential to form an integrated complex image, align the integrated complex image to a pre-selected phase to form an aligned complex image, determine a maximum energy phase using the aligned complex image, and compute a maximum energy image to represent the fingerprint based at least in part on the aligned complex image at the maximum energy phase.

30 Claims, 13 Drawing Sheets

(56) References Cited

OTHER PUBLICATIONS

Kazys R., et al., "Ultrasonic Fields Radiated Through Matching Layers with Nonparallel Boundaries", Ultrasonics, IPC Science and Technology Press Ltd, Guildford, GB, vol. 42, No. 1-9, Apr. 1, 2004 (Apr. 1, 2004), pp. 267-271, XP027331357, ISSN: 0041-624X [retrieved on Mar. 21, 2004].

Miklos G., et al., "Experimental Validation of a Convolution-Based Ultrasound Image Formation Model using a Planar Arrangement of Micrometer-Scale Scatterers", IEEE Transactions on Ultrasonics, Ferroelectrics and Frequency Control, vol. 62, No. 6, Jun. 1, 2015 (Jun. 1, 2015), pp. 1211-1219, XP011583954, IEEE, US, ISSN: 0885-3010, DOI : 10.1109/TUFFC.2015.007027 [retrieved on Jun. 8, 2015].

Oosterveld B.J., et al., "Ultrasound Attenuation and Texture Analysis of Diffuse Liver Disease: Methods and Preliminary Results", Physics in Medicine and Biology, Institute of Physics Publishing, vol. 36, No. 8, Aug. 1, 1991 (Aug. 1, 1991), pp. 1039-1064, XP020021868, Bristol GB, ISSN : 0031-9155, DOI: 10.1088/0031-9155/36/8/002, Section 2.1.

Tang X.M., "A Waveform Inversion Technique for Measuring Elastic Wave Attenuation in Cylindrical Bars", Geophysics, Society of Exploration Geophysicists, vol. 7, No. 6, Jun. 1, 1992 (Jun. 1, 1992), pp. 854-859, XP000289947, US, ISSN: 0016-8033.

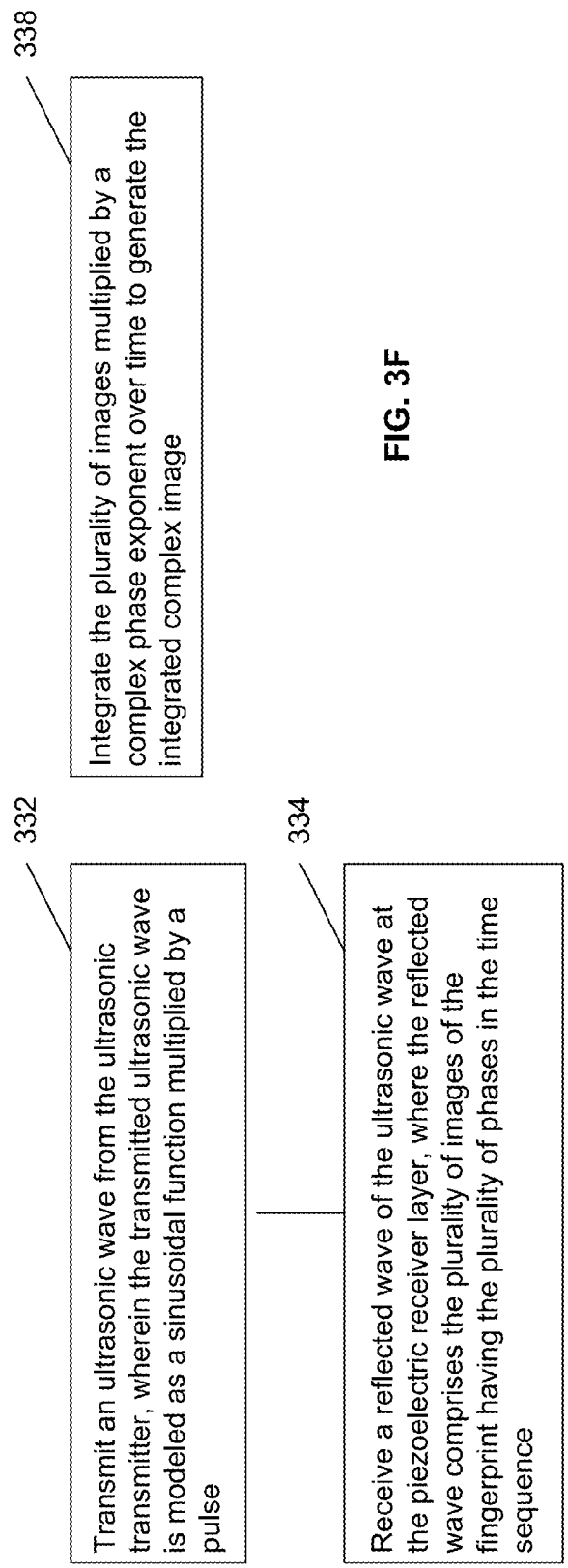

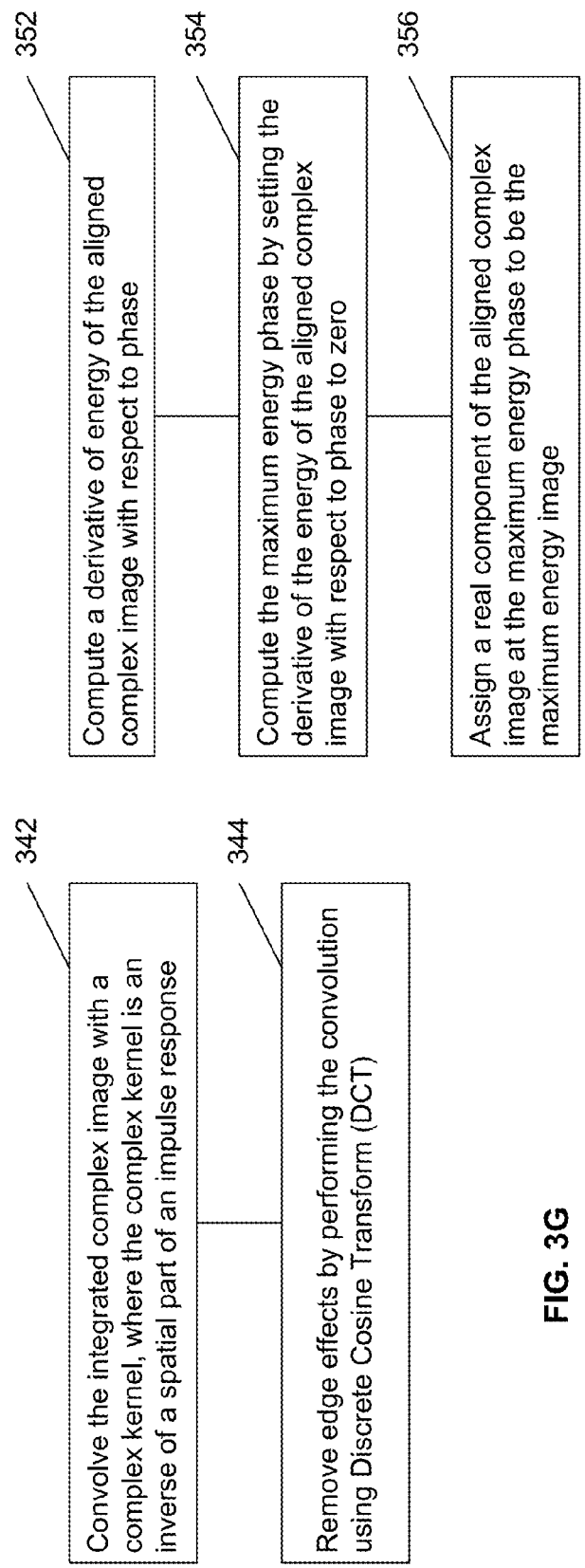

CORRECTION OF DIFFRACTION EFFECTS IN AN ULTRASONIC SENSOR

CROSS-REFERENCE TO RELATED APPLICATIONS

This application claims benefit of U.S. provisional application No. 62/188,706, "Correction of Diffraction Effects in an Ultrasonic Button" filed Jul. 5, 2015. The aforementioned United States application is hereby incorporated by reference in its entirety.

FIELD

The present disclosure relates to the field of image processing. In particular, the present disclosure relates to methods for correcting diffraction effects in an ultrasonic sensor.

BACKGROUND

In mobile devices, such as mobile phones, tablet computers and wearable devices, it is often desirable to protect the display and touch interfaces of the mobile devices with hard materials that can improve the mechanical robustness and reliability. However, adding a layer of hard materials between the sensor and the finger, such as a platen made of glass or plastic, can cause diffraction effects to the display and touch interfaces of the mobile devices.

FIG. 1A illustrates adverse effects of diffraction in an ultrasonic sensor. As shown in FIG. 1A, the diffraction effects can cause areas of the image to be severely attenuated, such as areas referenced by arrows 104. In addition, the diffraction effects can cause areas of the image be inverted with respect to other areas, such as areas references by arrows 106. Moreover, the signal to noise ratio (SNR) may be lower compared to a bare sensor. These adverse effects can lead to poor fingerprint match performance. Thus, it is desirable to correct the effects of diffraction in an ultrasonic sensor.

SUMMARY

Embodiments of correcting diffraction effects in an ultrasonic sensor are disclosed. In one embodiment, an ultrasonic sensor may include an ultrasonic transmitter configured to transmit an ultrasonic wave, a piezoelectric receiver layer configured to receive a reflected wave of the ultrasonic wave, where the reflected wave comprises a plurality of images of a fingerprint having a plurality of phases in a time sequence, and a platen layer configured to protect the ultrasonic transmitter and the piezoelectric receiver layer. The ultrasonic sensor may further include an ultrasonic sensor array and a processor configured to sum the plurality of images multiplied by a complex phase exponential to form an integrated complex image, align the integrated complex image to a pre-selected phase to form an aligned complex image, determine a maximum energy phase using the aligned complex image, and compute a maximum energy image to represent the fingerprint based at least in part on the aligned complex image at the maximum energy phase.

In another embodiment, a method of correcting effects of diffraction in a platen layer of an ultrasonic sensor is disclosed. The method includes capturing a plurality of images of a fingerprint having a plurality of phases in a time sequence, summing the plurality of images multiplied by a complex phase exponential to form an integrated complex image, aligning the integrated complex image to a pre-selected phase to form an aligned complex image, determining a maximum energy phase using the aligned complex image, and determining a maximum energy image to represent the fingerprint based at least in part on the aligned complex image at the maximum energy phase.

In some embodiments, the capturing a plurality of images of a fingerprint includes transmitting an ultrasonic wave from the ultrasonic transmitter, receiving a reflected wave of the ultrasonic wave at the piezoelectric receiver layer, where the reflected wave comprises the plurality of images of the fingerprint having the plurality of phases in the time sequence.

In some embodiments, the summing the plurality of images includes integrating the plurality of images multiplied by the complex phase exponential over time to generate the integrated complex image, where the integrated complex image includes a real image part and an imaginary image part, and the real image part and the imaginary image part have approximately 90 degrees offset in phase. The summing the plurality of images further includes removing time dependency of the transmitted signal.

In some embodiments, the aligning the integrated complex image to the pre-selected phase includes convolving the integrated complex image with a complex kernel, where the complex kernel is an inverse of a spatial part of an impulse response, and separating spatial components from phase components of the integrated complex image. The aligning the integrated complex image to the pre-selected phase may optionally/additionally include removing edge effect by using a duplicate of the integrated complex image along an edge of the integrated complex image.

In some embodiments, the determining the maximum energy image to represent the fingerprint may include computing a derivative of energy of the aligned complex image with respect to phase, computing the maximum energy phase by setting the derivative of the energy of the aligned complex image with respect to phase to zero, and assigning a real component of the aligned complex image at the maximum energy phase to be the maximum energy image.

According to aspects of the present disclosure, method of correcting effects of diffraction in a platen layer of an ultrasonic sensor may further include generating fingerprint image information using the maximum energy image, and using the fingerprint image information to authenticate a user with the ultrasonic sensor array.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 3E illustrates an exemplary implementation of capturing a plurality of images of a fingerprint; FIG. 3F illustrates an exemplary implementation of summing the plurality of images of a fingerprint of FIG. 3E; FIG. 3G illustrates an exemplary implementation of aligning an integrated complex image to a pre-selected phase; FIG. 3H illustrates an exemplary implementation of determining a maximum energy image to represent a fingerprint, according to aspects of the present disclosure.

DESCRIPTION OF EMBODIMENTS

Embodiments of correcting diffraction effects in an ultrasonic sensor are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1A:
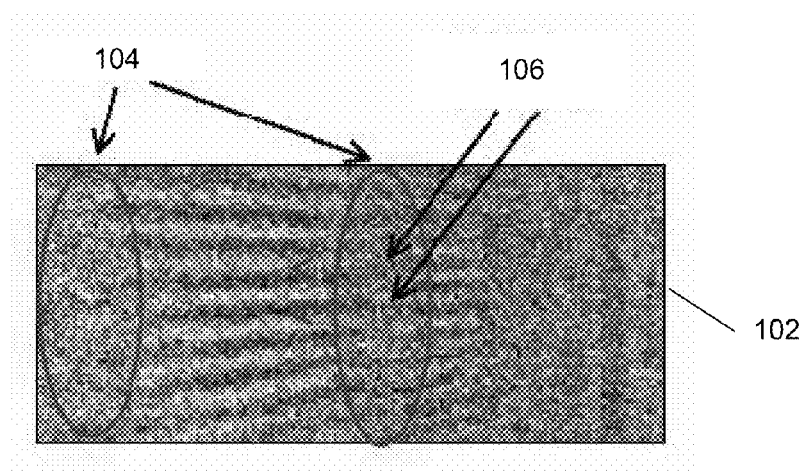
FIG. 1A illustrates adverse effects of diffraction in an ultrasonic sensor.
Figure 1B:
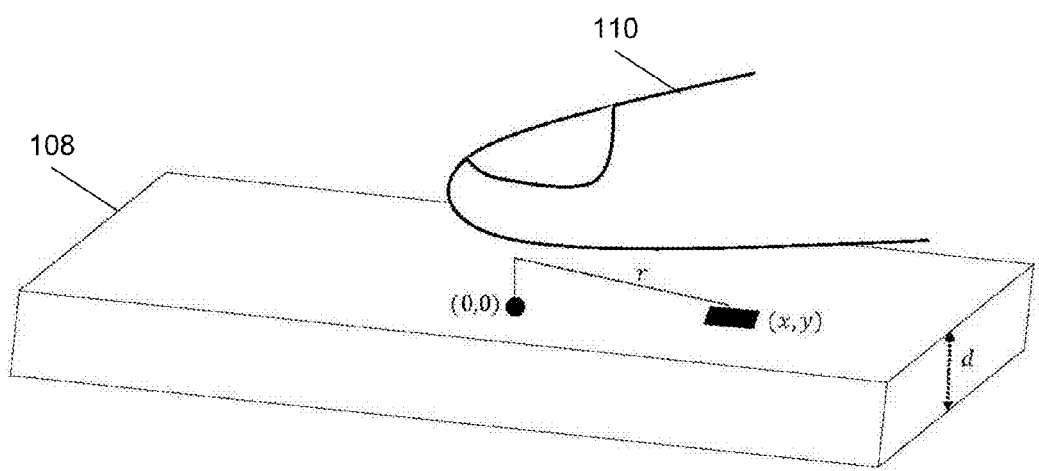
FIG. 1B illustrates a method of modeling effects of diffraction in an ultrasonic sensor according to aspects of the present disclosure.

FIG. 1B illustrates a method of modeling effects of diffraction in an ultrasonic sensor according to aspects of the present disclosure. In the example shown in FIG. 1B, to compute the contribution of the point (0,0) to the value of a pixel at (x,y), the acoustic signal can be assumed to travel from a transducer at the bottom of a platen 108 (for example, glass or plastic) to the top (a distance d), hits the finger 110, some of the energy can be absorbed by the finger 110 (or not, if it hits a valley) and then travels diagonally to the bottom towards (x,y). Therefore, $$r = d + \sqrt{(x^2 + y^2 + d^2)}$$

According to aspects of the present disclosure, the signal is assumed to drop exponentially as a function of the distance travelled. The attenuation constant is proportional to the frequency f. If s(t) is the signal transmitted at time t, and c is the speed of sound in glass, then it follows that the impulse response h(x,y,t) may be expressed as:

$$h(x,y,t) = e^{-\alpha f r} s(t - r/c)$$

and the measured image at time t, I(x,y,t), may be the convolution of the impulse response with the ideal image f(x,y) plus some white Gaussian noise:

$$I(x,y,t) = h(x,y,t) * f(x,y) + n(x,y,t)$$

f(x,y) is estimated given I(x,y,t) for several values of t. The transmitted signal s(t) can be a sinusoid multiplied by a pulse:

$$s(t) = \{\cos(2\pi f t + \phi), \text{ for } 0 < t < P/f; \text{ or } 0, \text{ otherwise}$$

where P is the number of periods transmitted, for example 5, and φ can be some phase which depends on the transmitting hardware (capacitors, inductors, etc.)

In some implementations, the expression for the impulse response h(x,y,t) can be simplified. If the attenuation constant α is small, then the exponential decay term may be neglected and h(x,y,t) may be expressed as:

$$h(x,y,t) = s(t - r/c) = \{\cos(2\pi f t - 2\pi f r/c + \phi), \text{ for } 0 < t - r/c < P/f; \text{ or } 0, \text{ otherwise}$$

Assuming for the times t for which the measurements of I are obtained: t−r/c<P/f is true for any t in this range and any r which is smaller than the size of the image. In addition, it can be assumed that the range of t's is small enough that t−r/c≈$t_0$−r/c for some constant to. It follows that $$h(x,y,t) = \{\cos(2\pi f t - 2\pi f r/c + \phi), \text{ for } r \leq r_{max}; \text{ or } 0, \text{ for } r > r_{max}$$

for some constant $r_{max}$.

Figure 2A:
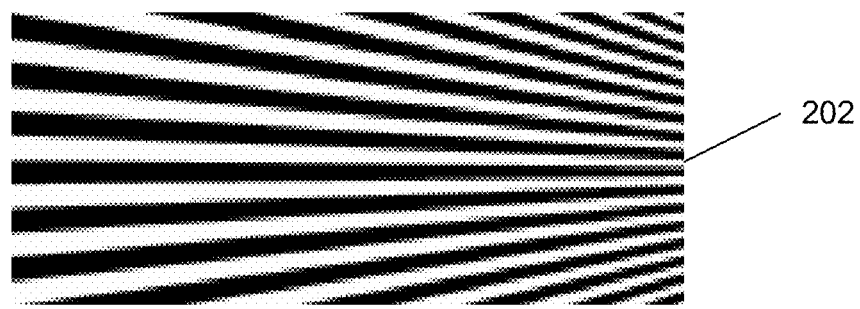
FIG. 2A illustrates an exemplary image used in modeling effects of diffraction.

FIG. 2A illustrates an exemplary image used in modeling effects of diffraction according to aspects of the present disclosure. The exemplary image 202 used in modeling effects of diffraction is also referred to as f(x,y) in the present disclosure.

Figure 2B:
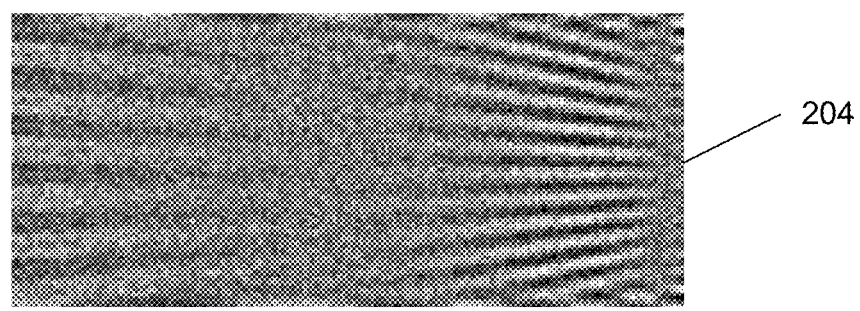
FIG. 2B illustrates a received image of FIG. 2A.
Figure 2C:
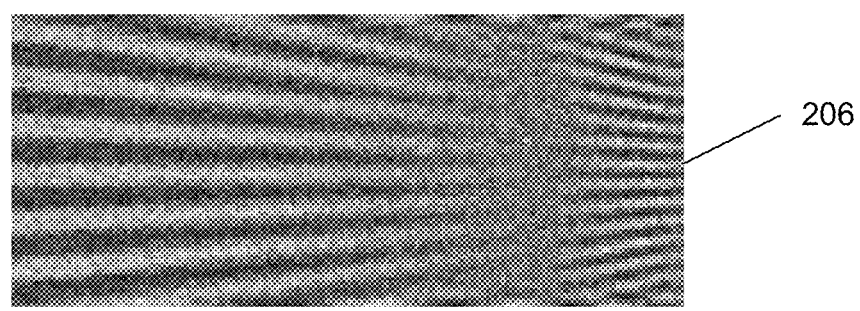
FIG. 2C illustrates another received image of FIG. 2A sampled at a different delay after transmission, according to aspects of the present disclosure.

FIG. 2B illustrates a received image of FIG. 2A according to aspects of the present disclosure. This received image 204 is the result obtained for I(x,y,t) for some values of t, f, c, P, φ, d, α (and noise). In the example of FIG. 2B, the received image 204 shows the artifacts (also referred to as clouds), i.e. attenuation of certain spatial frequencies and phase inversions between the two sides of the cloud. Note that if all parameters are kept fixed and only the time t is changed, the cloud can move, which is shown in the received image 206 of FIG. 2C.

Figure 3A:
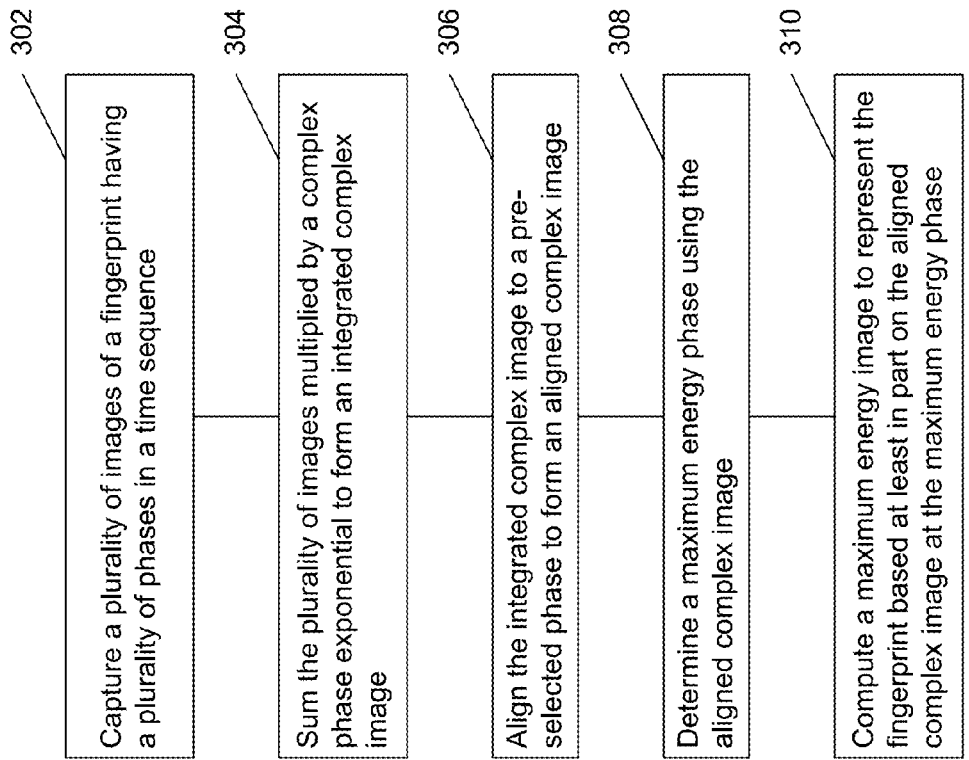
FIG. 3A illustrates a method of correcting effects of diffraction in a platen layer of an ultrasonic sensor according to aspects of the present disclosure.

FIG. 3A illustrates a method of correcting effects of diffraction in a platen layer of an ultrasonic sensor according to aspects of the present disclosure. As shown in FIG. 3A, in block 302, the method captures a plurality of images of a fingerprint having a plurality of phases in a time sequence, such as the image 204 shown in FIG. 2B and the image 206 shown in FIG. 2C. In block 304, the method sums the plurality of images multiplied by a complex phase exponential to form an integrated complex image. With this approach, the time dependent part of the impulse response $\cos(2\pi ft)$ can be removed.

In one embodiment, to remove the time dependent part, $I_1(x,y)$ may be computed as follows:

$$I_1(x,y)=\int I(x,y,t)e^{-2\pi ift}dt$$

where the integration is performed over values of t in the range of $I(x,y,t)$, to obtain:

$$I_1(x,y)=(\int\cos(2\pi ft-2\pi fr/c+\phi)e^{-2\pi ift}dt)*f(x,y)+n1(x,y)=$$
$$\text{const}\cdot(\exp(-2\pi ifr/c+i\phi)+O(f^{-1}))*f(x,y)+n1(x,y)$$

Note that if the integration is over all time, then the value of $(f^{-1})$ term may be small and negligible. In addition, the signal to noise ratio (SNR) of $I_1(x,y)$ can be higher than that of $I(x,y,t)$ for a single t by a factor of $\Delta t$, the range of integration.

Figure 3B:
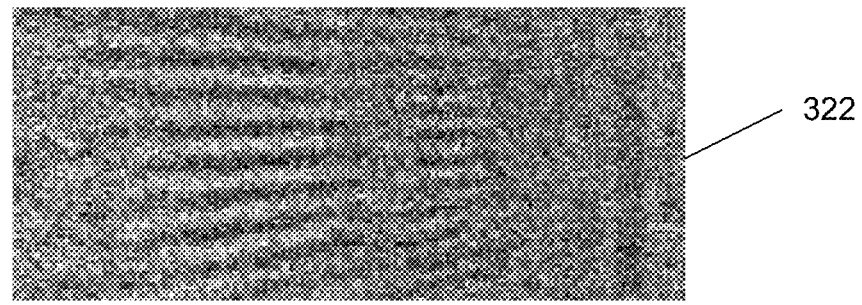
FIG. 3B illustrates an exemplary input image.
Figure 3C:
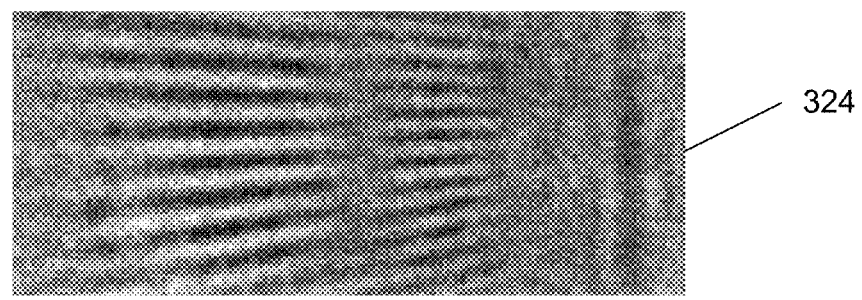
FIG. 3C illustrates a real part of an integrated complex image.
Figure 3D:
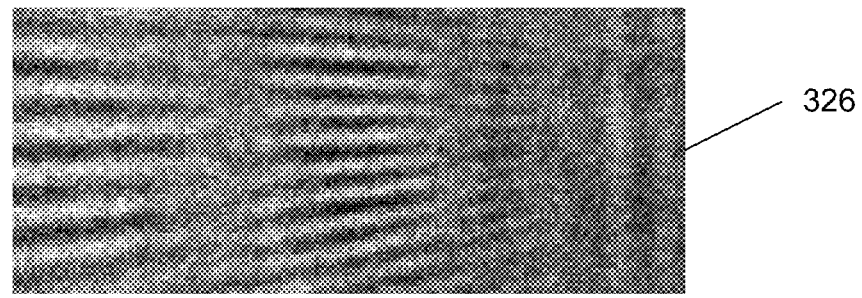
FIG. 3D illustrates an imaginary part of an integrated complex image, according to aspects of the present disclosure.

Note that $I_1(x,y)$ is a complex image. The real part of $I_1(x,y)$ and the imaginary parts of $I_1(x,y)$ can complement each other: where the real part of $I_1(x,y)$ has clouds, the imaginary part of $I_1(x,y)$ does not, or vice versa. These characteristics are shown in FIG. 3B-FIG. 3D. FIG. 3B illustrates an exemplary input image 322; FIG. 3C illustrates a real part 324 of an integrated complex image; FIG. 3D illustrates an imaginary part 326 of an integrated complex image, according to aspects of the present disclosure.

In FIG. 3C and FIG. 3D, note that the real part of $I_1(x,y)$ has the same phase as the input image, while the imaginary part of $I_1(x,y)$ may be 90° out of phase and complements the real part of $I_1(x,y)$. Also note that the SNR of the images has improved. Since the real and imaginary parts complement each other, the complex image has no clouds, even though the real and imaginary parts do have clouds.

FIG. 3E illustrates an exemplary implementation of capturing a plurality of images of a fingerprint according to aspects of the present disclosure. In block 332, an ultrasonic transmitter may be configured to transmit an ultrasonic wave. In block 334, a piezoelectric receiver layer may be configured to receive a reflected wave of the ultrasonic wave, where the reflected wave comprises the plurality of images of the fingerprint having the plurality of phases in the time sequence.

FIG. 3F illustrates an exemplary implementation of summing the plurality of images of a fingerprint according to aspects of the present disclosure. In block 338, the processor or processing logic may be configured to integrate the plurality of images multiplied by the complex phase exponential over time to generate the integrated complex image. Note that the integrated complex image includes a real image part and an imaginary image part, and where the real image part and the imaginary image part may have approximately 90 degrees offset in phase.

FIG. 3G illustrates an exemplary implementation of aligning an integrated complex image to a pre-selected phase according to aspects of the present disclosure. In block 342, a processor or processing logic may be configured to convolve the integrated complex image with a complex kernel, where the complex kernel is an inverse of a spatial part of an impulse response. In some embodiments, the processor or processing logic may be optionally/additionally configured to separate spatial components from phase components of the integrated complex image using other approaches. In block 344, a processor or processing logic may be configured to remove edge effects by performing the convolution using Discrete Cosine Transform (DCT). In some embodiments, the processor or processing logic may be optionally/additionally configured to remove edge effect by using a duplicate of the integrated complex image along an edge of the integrated complex image.

FIG. 3H illustrates an exemplary implementation of determining a maximum energy image to represent a fingerprint according to aspects of the present disclosure. In block 352, a processor or processing logic may be configured to compute a derivative of energy of the aligned complex image with respect to phase. In block 354, the processor or processing logic may be configured to compute the maximum energy phase by setting the derivative of the energy of the aligned complex image with respect to phase to zero. In block 356, the processor or processing logic may be configured to assign a real component of the aligned complex image at the maximum energy phase to be the maximum energy image.

Figure 4A:
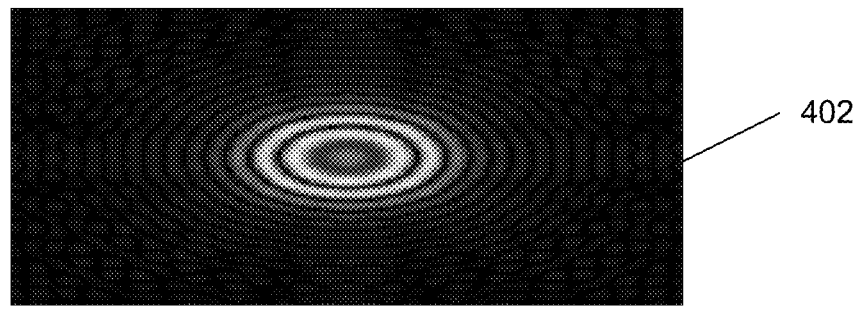
FIG. 4A illustrates an exemplary representation of a real part of an estimated frequency response of a simulated diffraction.
Figure 4B:
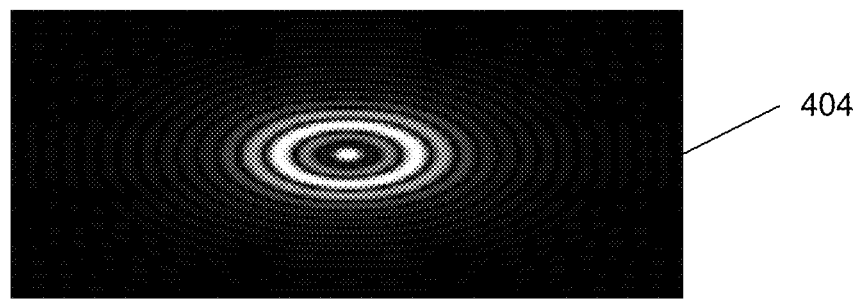
FIG. 4B illustrates an exemplary representation of an imaginary part of estimated frequency response of a simulated diffraction.

Referring to FIG. 4A and FIG. 4B, in the frequency domain, $\cos(-2\pi fr/c+\phi)$ and $\sin(-2\pi fr/c+\phi)$ may be represented as FIG. 4A and FIG. 4B, respectively. FIG. 4A illustrates an exemplary representation of a real part 402 of an estimated frequency response of a simulated diffraction; FIG. 4B illustrates an exemplary representation of an imaginary part 404 of estimated frequency response of a simulated diffraction according to aspects of the present disclosure.

Figure 4C:
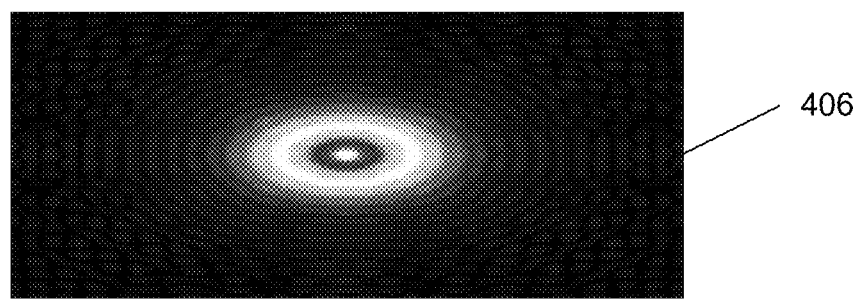
FIG. 4C illustrates an exemplary representation of a sum of FIG. 4A and FIG. 4B, according to aspects of the present disclosure.

FIG. 4C illustrates an exemplary representation 406 of a sum of FIG. 4A and FIG. 4B according to aspects of the present disclosure. As shown in FIG. 4C, the black rings in the spectrum of the real and imaginary parts correspond to the position of the clouds, while the spectrum of the complex exponential is much smoother. In addition, the position of the black rings changes when $\phi$ is changed, while the spectrum of the exponential may be the same, only the phase changes. Another advantage of the complex exponent is that it allows the spatial term to be separated from the overall phase term.

Referring back to FIG. 3A, in block 306, the method aligns the integrated complex image to a pre-selected phase to form an aligned complex image. Note that, in some embodiments, the pre-selected phase may be a matrix of phases (an image). With this approach, the spatial part of the impulse response $-2\pi fr/c$ can be removed. In the model shown above, the output from the first step, $I_1(x,y)$, may be approximately equal to (up to a constant and some additive noise):

$$I_1(x,y)=e^{i\phi}h_1*f(x,y)$$

$$h_1=\exp(-2\pi ifr/c)$$

Since $h_1$ is known, $I_1(x,y)$ can be convolved with its inverse:

$$h_1^{-1}=\mathcal{F}^{-1}(1/\mathcal{F}h_1)$$

However, since the spectrum of $h_1$ can be close to zero at some points, the following operation is performed:

$$h_2=\mathcal{F}^{-1}((\mathcal{F}h_1)*/|\mathcal{F}h_1|)$$

$$I_2(x,y)=h_2*I_1=e^{i\phi}\mathcal{F}^{-1}(|\mathcal{F}h_1|)*f(x,y)$$

The middle term is a band-pass filter without any phase distortions.

Figure 5A:
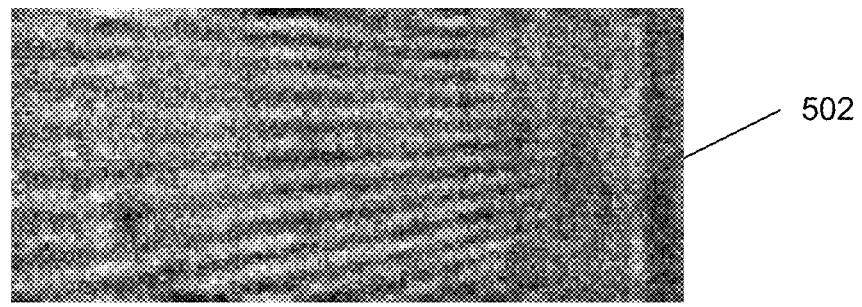
FIG. 5A illustrates an exemplary real part of an aligned complex image.
Figure 5B:
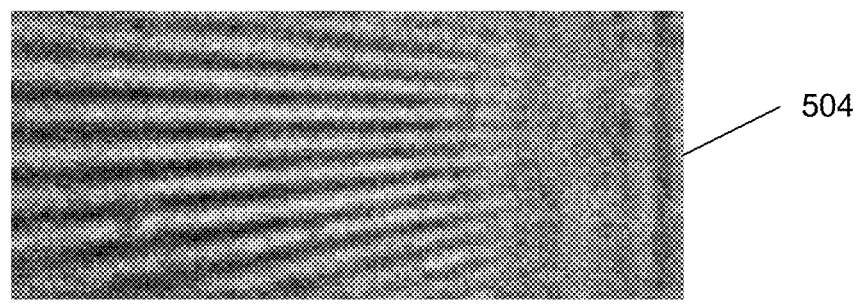
FIG. 5B illustrates an exemplary imaginary part of an aligned complex image.

In order to avoid edge effects during the convolution with $h_2$, in one exemplary approach, the convolution may be performed with an image twice the size of the original image by mirror reflecting along each edge and taking the middle part at the end. FIG. 5A illustrates an exemplary real part 502 of an aligned complex image; FIG. 5B illustrates an exemplary imaginary part 504 of an aligned complex image according to aspects of the present disclosure.

Referring back to FIG. 3A, in block 308, the method determines a maximum energy phase using the aligned complex image. In block 310, the method computes a maximum energy image to represent the fingerprint based at least in part on the aligned complex image at the maximum energy phase. With this approach, the overall phase $\phi$ can be removed. In the examples shown in FIG. 5A and FIG. 5B, the imaginary part 504 of the aligned complex image has better image quality than the real part 502 of the aligned complex image, and note that both the imaginary part 504 and the real part 502 of the aligned complex image do not have phase inversions. The reason is that $\phi \approx \pm \pi/2$ in this case. To find the optimal phase in the general case, the phase that gives maximum energy to the real part can be computed as:

$$\phi_0 = \arg{}_\phi \max\{\int [Re(e^{i\phi}I_2(x,y))]^2 dxdy\} \text{ and then set}$$

$$I_3(x,y) = Re(e^{i\phi_0}I_2(x,y))$$

In this optimization method, the expression can be differentiated with respect to $\phi$, $$Se^{2i\phi} + S^* e^{-2i\phi}$$

With $$S = \int I_2(x,y)^2 dxdy$$

Note that S is a complex number, not the total energy. Equating to 0 gives:

$$e^{i\phi_0} = \sqrt{(\pm |S|/S)}$$

The positive sign is chosen because the negative sign gives a minimum. In one embodiment, $I_3$ may be computed as:

$$I_3 = (I_2 \sqrt{S})$$

Figure 5C:
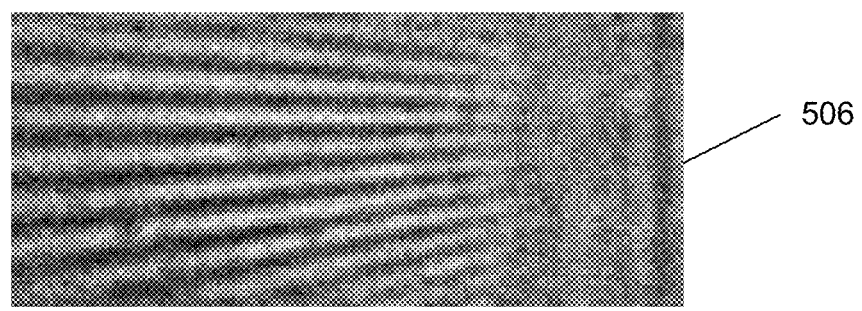
FIG. 5C illustrates an exemplary maximum energy image, according to aspects of the present disclosure.

Note that S has two square roots differing only by a sign. To fix the overall sign, the correlation coefficient of $I_3$ with one of the input images can be computed. In some implementations, if $I_3$ turns out to be negative, then it may be set as: $I_3 = -I_3$. FIG. 5C illustrates an exemplary maximum energy image 506, according to aspects of the present disclosure.

According to aspects of the present disclosure, parameters for the speed of sound c and $r_{max}$ may be chosen. Other parameters may be set to their known values. In some embodiments, both c and $r_{max}$ may be obtained by choosing the parameters that produces the highest quality output images. In some implementations, for a glass layer, the values of c and $r_{max}$ may be chosen as: c=3700 m/s, $r_{max}$=1.33. For a plastic layer, the values of c and $r_{max}$ may be chosen as: c=2000 m/s, $r_{max}$=1.33.

Figure 6A:
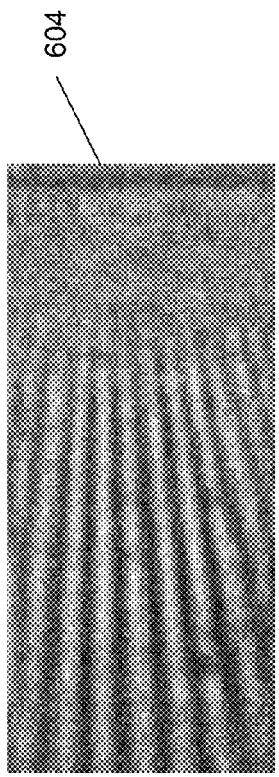
FIG. 6A illustrates a processed image using an estimated speed of sound in the platen layer of the ultrasonic sensor.
Figure 6B:
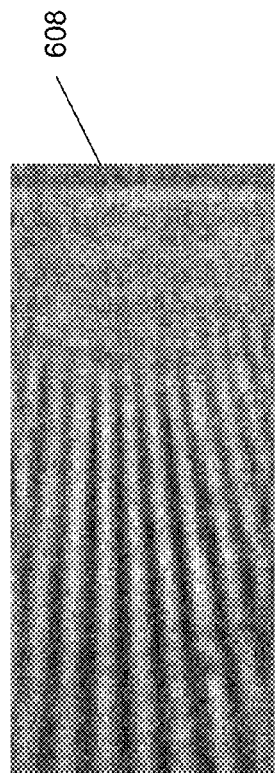
FIG. 6B illustrates another processed image using another estimated speed of sound in the platen layer of the ultrasonic sensor.

Note that the method described herein can work even if the values of the parameters are may not be exact. For example, if c is changed by ~±20%, reasonably good images may still be obtained. FIG. 6A illustrates a processed image 602 using an estimated speed of sound in the platen layer of the ultrasonic sensor; FIG. 6B illustrates another processed image 604 using another estimated speed of sound in the platen layer of the ultrasonic sensor according to aspects of the present disclosure.

Figure 6C:
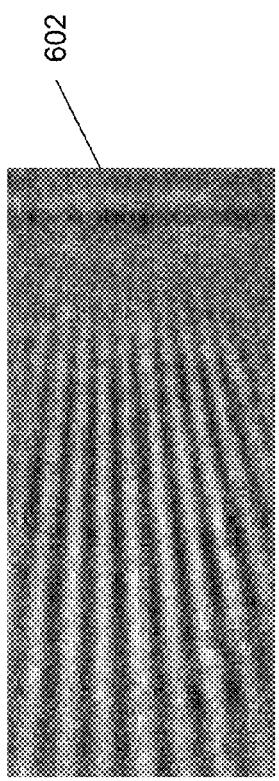
FIG. 6C illustrates yet another processed image using an estimated diagonal maximum distance of FIG. 1B.
Figure 6D:
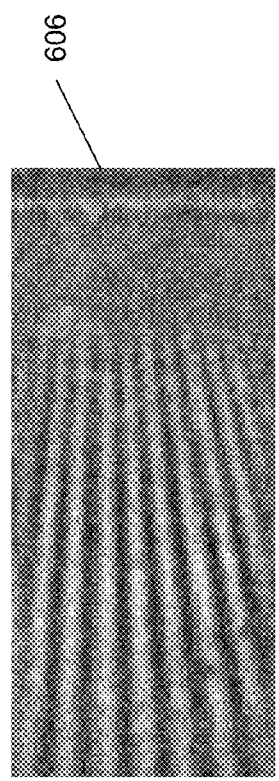
FIG. 6D illustrates yet another processed image using another estimated diagonal maximum distance of FIG. 1B, according to aspects of the present disclosure.

Similarly, if $r_{max}$ is changed by ~±20%, reasonably good images may still be obtained. FIG. 6C illustrates yet another processed image 606 using an estimated diagonal maximum distance of FIG. 1B; FIG. 6D illustrates yet another processed image 608 using another estimated diagonal maximum distance of FIG. 1B according to aspects of the present disclosure.

Figure 7:
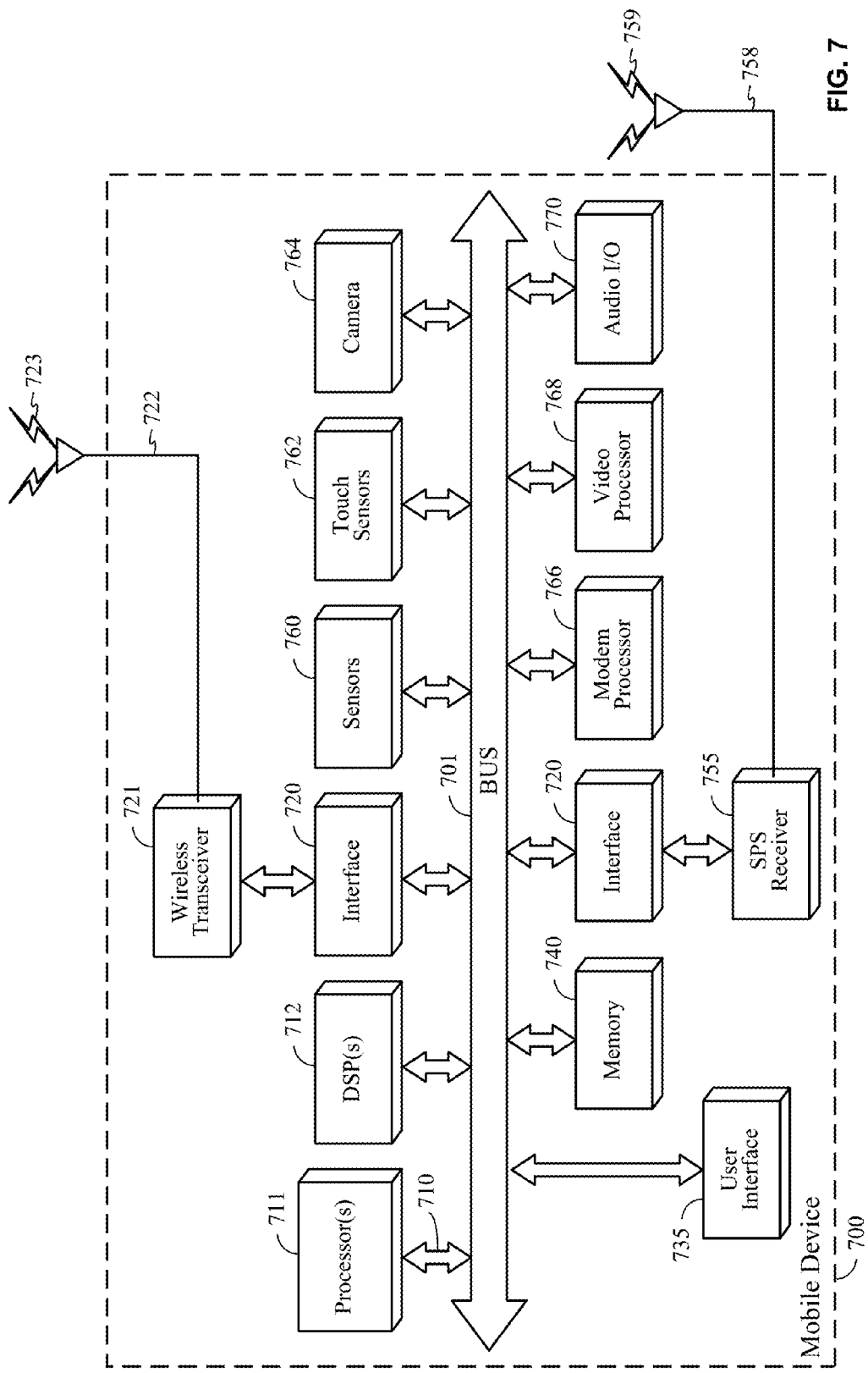
FIG. 7 illustrates an exemplary block diagram of a mobile device that may use an ultrasonic sensor according to aspects of the present disclosure.

FIG. 7 illustrates an exemplary block diagram of a device that may use an ultrasonic sensor according to aspects of the present disclosure. A device that may use an ultrasonic sensor may comprise one or more features of mobile device 700 shown in FIG. 7. In certain embodiments, mobile device 700 may include a wireless transceiver 721 that is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also comprise GPS receiver 755 capable of receiving and acquiring GPS signals 759 via GPS antenna 758. GPS receiver 755 may also process, in whole or in part, acquired GPS signals 759 for estimating a location of a mobile device. In some embodiments, processor(s) 711, memory 740, DSP(s) 712 and/or specialized processors (not shown) may also be utilized to process acquired GPS signals, in whole or in part, and/or calculate an estimated location of mobile device 700, in conjunction with GPS receiver 755. Storage of GPS or other signals may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few examples. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless station. Processor(s) 711 and/or DSP(s) 712 may execute instructions to execute one or more aspects of processes/methods discussed below in connection with FIG. 8. Processor(s) 711 and/or DSP(s) 712 may perform the methods and functions of FIG. 3A, and FIG. 3E-3H.

Also shown in FIG. 7, a user interface 735 may comprise any one of several devices such as, for example, a speaker, microphone, display device, vibration device, keyboard, touch screen, etc. A user interface signal provided to a user may be one or more outputs provided by any of the speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or GPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8A:
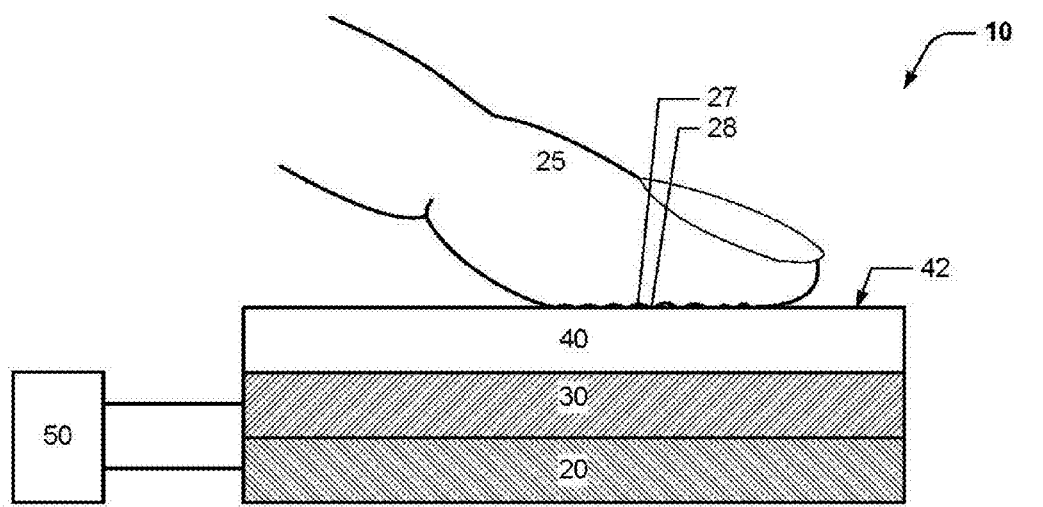
FIGS. 8A-8C illustrate an example of an ultrasonic sensor according to aspects of the present disclosure.
Figure 8B:
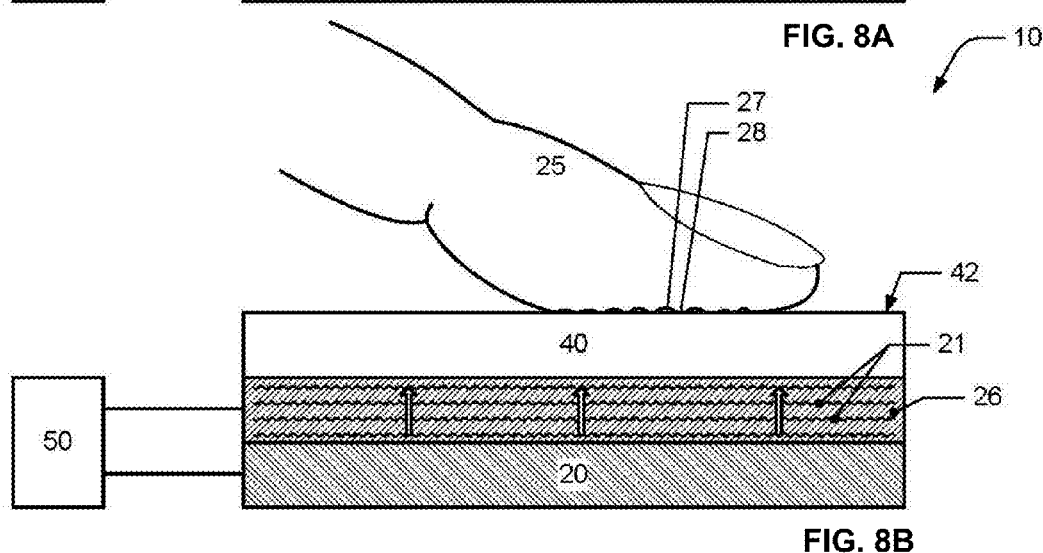
Figure 8C:
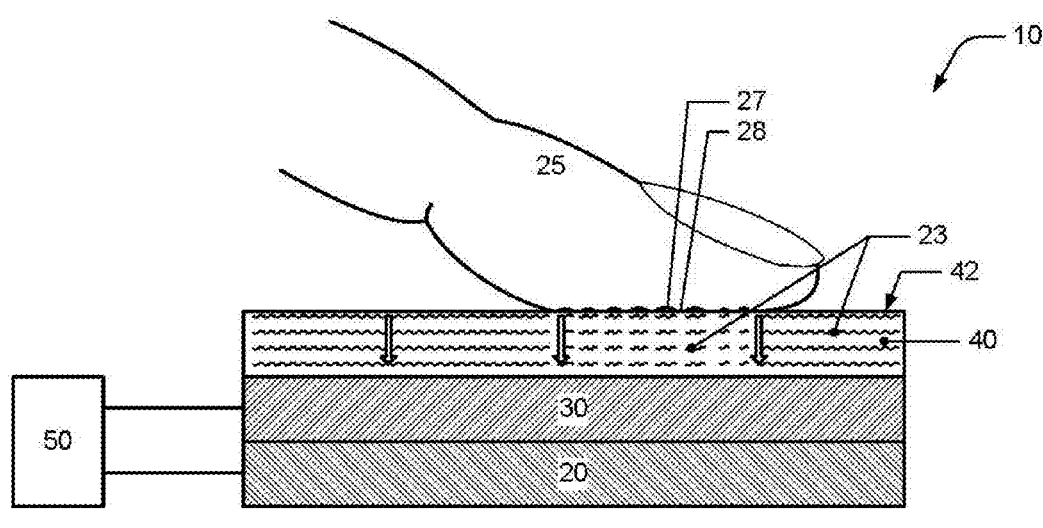

FIGS. 8A-8C illustrate an example of an ultrasonic sensor according to aspects of the present disclosure. As shown in FIG. 8A, ultrasonic sensor 10 may include an ultrasonic transmitter 20 and an ultrasonic receiver 30 under a platen 40. The ultrasonic transmitter 20 may be a piezoelectric transmitter that can generate ultrasonic waves 21 (see FIG. 8B). The ultrasonic receiver 30 may include a piezoelectric material and an array of pixel circuits disposed on a substrate. In operation, the ultrasonic transmitter 20 generates one or more ultrasonic waves that travel through the ultrasonic receiver 30 to the exposed surface 42 of the platen 40. At the exposed surface 42 of the platen 40, the ultrasonic energy may be transmitted, absorbed or scattered by an object 25 that is in contact with the platen 40, such as the skin of a fingerprint ridge 28, or reflected back. In those locations where air contacts the exposed surface 42 of the platen 40, e.g., valleys 27 between fingerprint ridges 28, most of the ultrasonic wave will be reflected back toward the ultrasonic receiver 30 for detection (see FIG. 8C). Control electronics 50 may be coupled to the ultrasonic transmitter 20 and ultrasonic receiver 30 and may supply timing signals that cause the ultrasonic transmitter 20 to generate one or more ultrasonic waves 21. The control electronics 50 may then receive signals from the ultrasonic receiver 30 that are indicative of reflected ultrasonic energy 23. The control electronics 50 may use output signals received from the ultrasonic receiver 30 to construct a digital image of the object 25. In some implementations, the control electronics 50 may also, over time, successively sample the output signals to detect the presence and/or movement of the object 25.

According to aspects of the present disclosure, an ultrasonic sensor may include an ultrasonic transmitter 20 and an ultrasonic receiver 30 under a platen 40. The ultrasonic transmitter 20 may be a plane wave generator including a substantially planar piezoelectric transmitter layer. Ultrasonic waves may be generated by applying a voltage to the piezoelectric layer to expand or contract the layer, depending upon the signal applied, thereby generating a plane wave. The voltage may be applied to the piezoelectric transmitter layer via a first transmitter electrode and a second transmitter electrode. In this fashion, an ultrasonic wave may be made by changing the thickness of the layer via a piezoelectric effect. This ultrasonic wave travels toward a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes may be metallized electrodes, for example, metal layers that coat opposing sides of the piezoelectric transmitter layer.

The ultrasonic receiver 30 may include an array of pixel circuits disposed on a substrate, which also may be referred to as a backplane, and a piezoelectric receiver layer. In some implementations, each pixel circuit may include one or more TFT elements, electrical interconnect traces and, in some implementations, one or more additional circuit elements such as diodes, capacitors, and the like. Each pixel circuit may be configured to convert an electric charge generated in the piezoelectric receiver layer proximate to the pixel circuit into an electrical signal. Each pixel circuit may include a pixel input electrode that electrically couples the piezoelectric receiver layer to the pixel circuit.

Figure 9A:
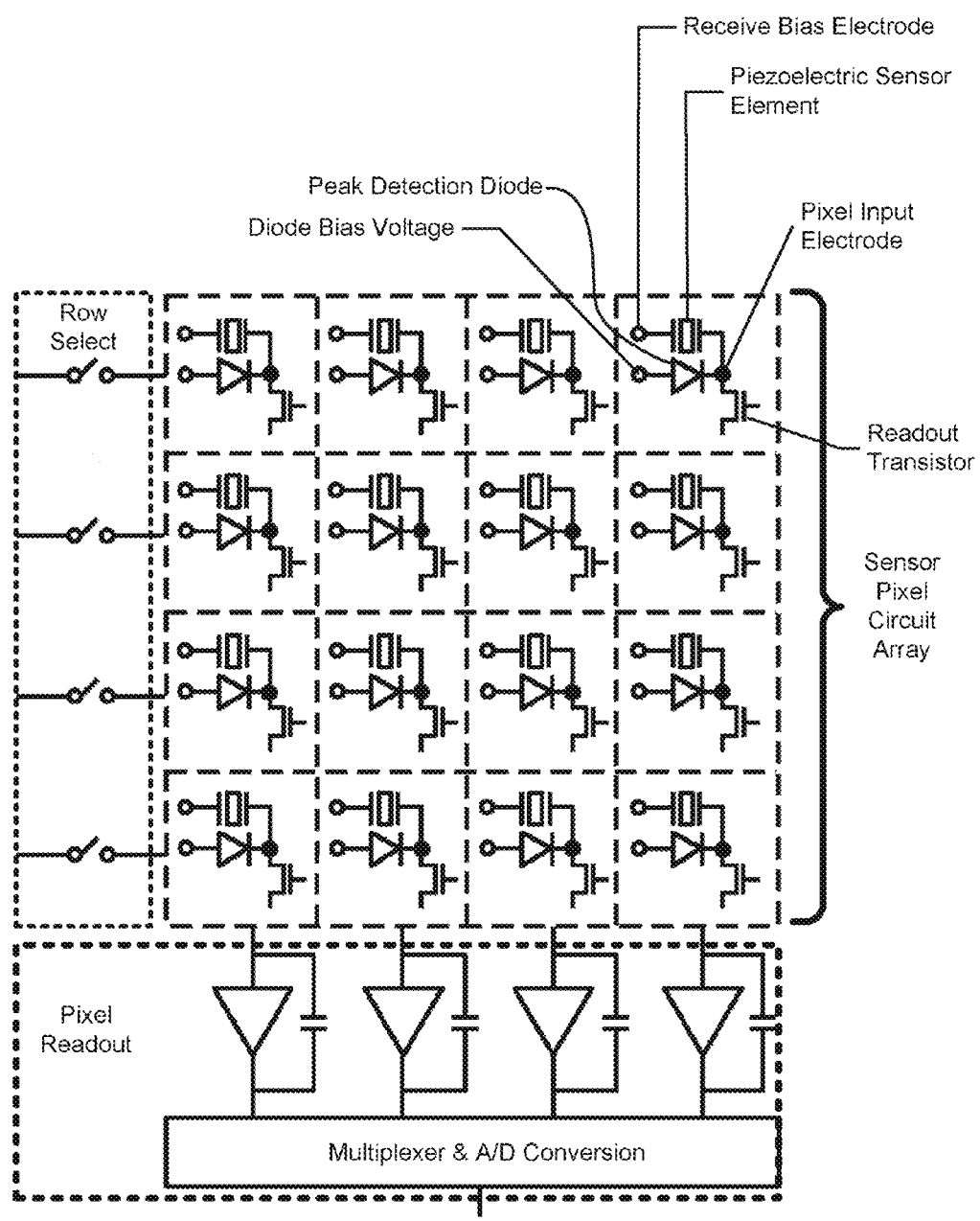
FIG. 9A illustrates an example of a four-by-four array of sensor pixels for an ultrasonic sensor array.

In the illustrated implementation, a receiver bias electrode is disposed on a side of the piezoelectric receiver layer proximal to platen 40. The receiver bias electrode may be a metallized electrode and may be grounded or biased to control which signals are passed to the TFT array. Ultrasonic energy that is reflected from the exposed (top) surface 42 of the platen 40 is converted into localized electrical charges by the piezoelectric receiver layer. These localized charges are collected by the pixel input electrodes and are passed on to the underlying pixel circuits. The charges may be amplified by the pixel circuits and provided to the control electronics, which processes the output signals. A simplified schematic of an example pixel circuit is shown in FIG. 9A, however one of ordinary skill in the art will appreciate that many variations of and modifications to the example pixel circuit shown in the simplified schematic may be contemplated.

Control electronics 50 may be electrically connected to the first transmitter electrode and the second transmitter electrode, as well as to the receiver bias electrode and the pixel circuits on the substrate. The control electronics 50 may operate substantially as discussed previously with respect to FIGS. 8A-8C.

The platen 40 may be any appropriate material that can be acoustically coupled to the receiver, with examples including plastic, ceramic, glass, sapphire, stainless steel, a metal alloy, polycarbonate, a polymeric material, or a metal-filled plastic. In some implementations, the platen 40 can be a cover plate, e.g., a cover glass or a lens glass for a display device or an ultrasonic sensor. Detection and imaging can be performed through relatively thick platens if desired, e.g., 3 mm and above.

Examples of piezoelectric materials that may be employed according to various implementations include piezoelectric polymers having appropriate acoustic properties, for example, acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer and the piezoelectric receiver layer may be selected so as to be suitable for generating and receiving ultrasonic waves. In one example, a PVDF piezoelectric transmitter layer is approximately 28 μm thick and a PVDF-TrFE receiver layer is approximately 12 μm thick. Example frequencies of the ultrasonic waves are in the range of 5 MHz to 30 MHz, with wavelengths on the order of a quarter of a millimeter or less.

FIGS. 8A-8C show example arrangements of ultrasonic transmitters and receivers in an ultrasonic sensor, with other arrangements possible. For example, in some implementations, the ultrasonic transmitter 20 may be above the ultrasonic receiver 30, i.e., closer to the object of detection. In some implementations, the ultrasonic sensor may include an acoustic delay layer. For example, an acoustic delay layer can be incorporated into the ultrasonic sensor 10 between the ultrasonic transmitter 20 and the ultrasonic receiver 30. An acoustic delay layer can be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor 10 is arriving at the ultrasonic receiver 30. In some implementations, the TFT substrate and/or the platen 40 may serve as an acoustic delay layer.

FIG. 9A depicts a 4×4 pixel array of pixels for an ultrasonic sensor. Each pixel may, for example, be associated with a local region of piezoelectric sensor material, a peak detection diode and a readout transistor; many or all of these elements may be formed on or in the backplane to form the pixel circuit. In practice, the local region of piezoelectric sensor material of each pixel may transduce received ultrasonic energy into electrical charges. The peak detection diode may register the maximum amount of charge detected by the local region of piezoelectric sensor material. Each row of the pixel array may then be scanned, e.g., through a row select mechanism, a gate driver, or a shift register, and the readout transistor for each column may be triggered to allow the magnitude of the peak charge for each pixel to be read by additional circuitry, e.g., a multiplexer and an A/D converter. The pixel circuit may include one or more TFTs to allow gating, addressing, and resetting of the pixel.

Each pixel circuit may provide information about a small portion of the object detected by the ultrasonic sensor 10. While, for convenience of illustration, the example shown in FIG. 9A is of a relatively coarse resolution, ultrasonic sensors having a resolution on the order of 500 pixels per inch or higher that are configured with a layered structure. The detection area of the ultrasonic sensor 10 may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the object.

Figure 9B:
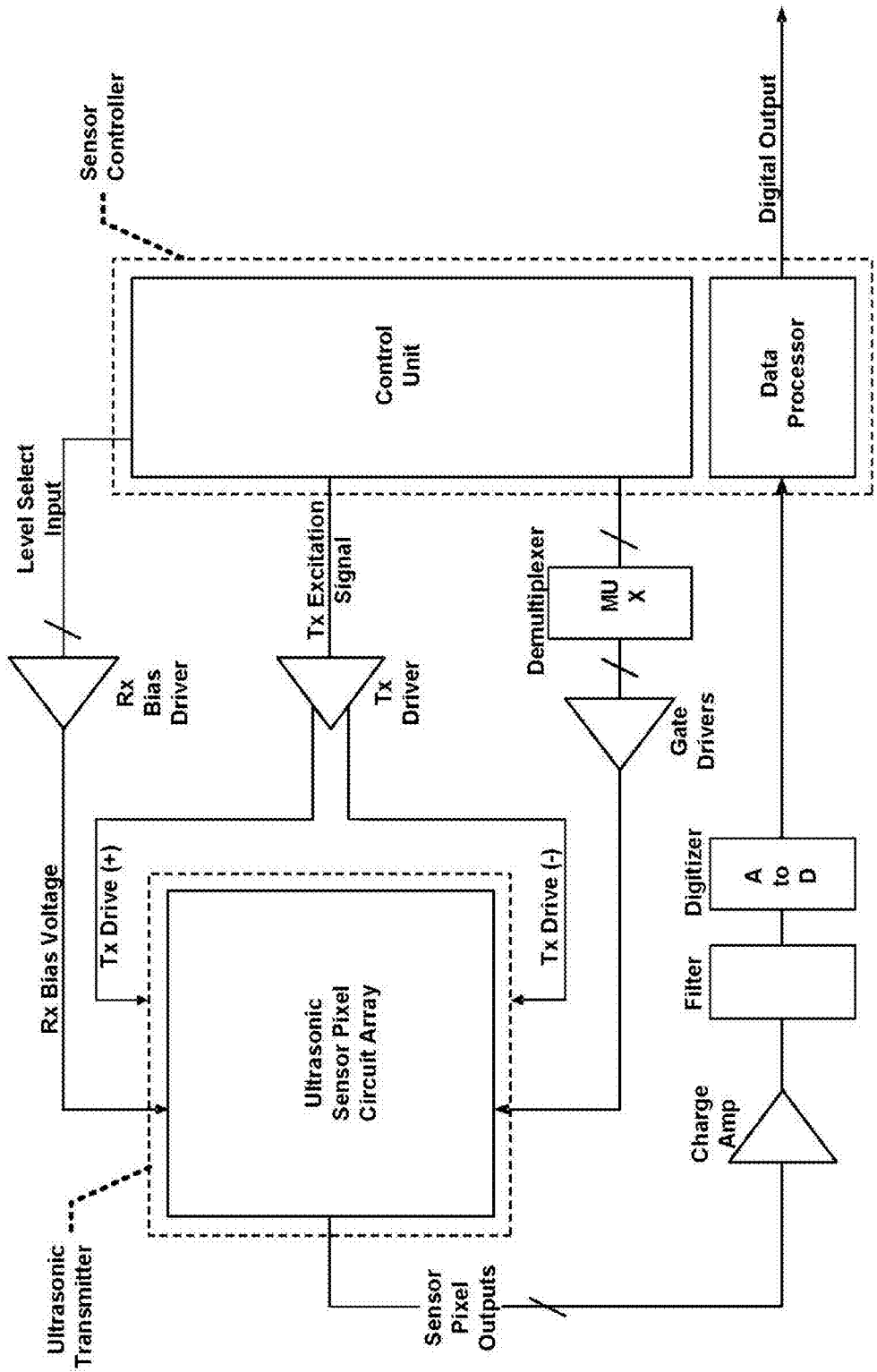
FIG. 9B illustrates an example of a high-level block diagram of an ultrasonic sensor system.

FIG. 9B shows an example of a high-level block diagram of an ultrasonic sensor system. Many of the elements shown may form part of control electronics 50. A sensor controller may include a control unit that is configured to control various aspects of the sensor system, e.g., ultrasonic transmitter timing and excitation waveforms, bias voltages for the ultrasonic receiver and pixel circuitry, pixel addressing, signal filtering and conversion, readout frame rates, and so forth. The sensor controller may also include a data processor that receives data from the ultrasonic sensor circuit pixel array. The data processor may translate the digitized data into image data of a fingerprint or format the data for further processing.

For example, the control unit may send a transmitter (Tx) excitation signal to a Tx driver at regular intervals to cause the Tx driver to excite the ultrasonic transmitter and produce planar ultrasonic waves. The control unit may send level select input signals through a receiver (Rx) bias driver to bias the receiver bias electrode and allow gating of acoustic signal detection by the pixel circuitry. A demultiplexer may be used to turn on and off gate drivers that cause a particular row or column of sensor pixel circuits to provide sensor output signals. Output signals from the pixels may be sent through a charge amplifier, a filter such as an RC filter or an anti-aliasing filter, and a digitizer to the data processor. Note that portions of the system may be included on the TFT backplane and other portions may be included in an associated integrated circuit.

According to aspects of the present disclosure, ultrasonic sensors can be configured to produce high-resolution fingerprint images for user verification and authentication. In some implementations, ultrasonic fingerprint sensors can be configured to detect reflected signals proportional to the differential acoustic impedance between an outer surface of a platen and a finger ridge (tissue) and valley (air). For example, a portion of the ultrasonic wave energy of an ultrasonic wave may be transmitted from the sensor into finger tissue in the ridge areas while the remaining portion of the ultrasonic wave energy is reflected back towards the sensor, whereas a smaller portion of the wave may be transmitted into the air in the valley regions of the finger while the remaining portion of the ultrasonic wave energy is reflected back to the sensor. Methods of correcting diffraction effects disclosed herein may increase the overall signal and image contrast from the sensor.

According to aspects of the present disclosure, ultrasonic sensors with fingerprint sensors can be applied for user authentication in a wide range of applications, including mobile phones, tablet computers, wearable devices and medical devices. Ultrasonic authenticating buttons may be utilized in personal medical devices such as drug delivery devices. These devices may be wirelessly connected to track and verify the identification of a user, type of drug, dosage, time of delivery, and style of delivery. The on-device authenticating button can be configured to allow single-user enrollment (e.g., at home or at a pharmacy) and local verification for subsequent consumption of the drug. Rapid identification and verification may appear seamless with the delivery of the drug, as depressions of the ultrasonic sensor can be configured to invoke user verification and drug delivery. Mobile-connected authenticated drug delivery devices may include personalized pen-injectors and inhalers. Connected injector pens, inhalers and other medical devices may incorporate an ultrasonic sensor for patient identification and verification.

Note that at least the following three paragraphs, FIG. 3A, FIG. 3E-3H, FIG. 7 through FIG. 9B and their corresponding descriptions provide means for capturing a plurality of images of a fingerprint having a plurality of phases in a time sequence; means for summing the plurality of images multiplied by a complex phase exponential to form an integrated complex image; means for aligning the integrated complex image to a pre-selected phase to form an aligned complex image; means for determining a maximum energy phase using the aligned complex image; means for determining a maximum energy image to represent the fingerprint based at least in part on the aligned complex image at the maximum energy phase; means for transmitting an ultrasonic wave; means for receiving a reflected wave of the ultrasonic wave; means for integrating the plurality of images multiplied by the complex phase exponential over time to generate the integrated complex image; means for convolving the integrated complex image with a complex kernel; means for removing edge effects by performing the convolution using Discrete Cosine Transform; means for computing a derivative of energy of the aligned complex image with respect to phase; means for computing the maximum energy phase by setting the derivative of the energy of the aligned complex image with respect to phase to zero; means for assigning a real component of the aligned complex image at the maximum energy phase to be the maximum energy image; means for generating fingerprint image information using the maximum energy image; and means for using the fingerprint image information to authenticate a user with the ultrasonic sensor array.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with a GPS that includes any one of several GNSS and/or combinations of GNSS. Furthermore, such techniques may be used with positioning systems that utilize terrestrial transmitters acting as "pseudolites", or a combination of satellite vehicles (SVs) and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment a GPS in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "GPS signals" and/or "SV signals", as used herein, is intended to include GPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of correcting effects of diffraction in a platen layer of an ultrasonic sensor, wherein the ultrasonic sensor comprises an ultrasonic transmitter, a piezoelectric receiver layer, an ultrasonic sensor array and a processor, comprising:
   capturing a plurality of images of a fingerprint having a plurality of phases in a time sequence;
   summing the plurality of images multiplied by a complex phase exponential to form an integrated complex image;
   aligning the integrated complex image to a pre-selected phase to form an aligned complex image;
   determining a maximum energy phase using the aligned complex image; and
   determining a maximum energy image to represent the fingerprint based at least in part on the aligned complex image at the maximum energy phase.

2. The method of claim 1, wherein capturing a plurality of images of a fingerprint comprises:
   transmitting an ultrasonic wave from the ultrasonic transmitter, wherein the transmitted ultrasonic wave is modeled as a sinusoidal function multiplied by a pulse; and
   receiving a reflected wave of the ultrasonic wave at the piezoelectric receiver layer, wherein the reflected wave comprises the plurality of images of the fingerprint having the plurality of phases in the time sequence.

3. The method of claim 1, wherein summing the plurality of images comprises:
   integrating the plurality of images multiplied by the complex phase exponential over time to generate the integrated complex image,
   wherein the integrated complex image includes a real image part and an imaginary image part, and wherein the real image part and the imaginary image part have approximately 90 degrees offset in phase.

4. The method of claim 1, wherein aligning the integrated complex image to the pre-selected phase comprises:
   convolving the integrated complex image with a complex kernel, wherein the complex kernel is an inverse of a spatial part of an impulse response.

5. The method of claim 4, further comprising
   removing edge effects by performing the convolution using Discrete Cosine Transform.

6. The method of claim 1, wherein determining the maximum energy phase comprises:
   computing a derivative of energy of the aligned complex image with respect to phase; and
   computing the maximum energy phase by setting the derivative of the energy of the aligned complex image with respect to phase to zero.

7. The method of claim 1, wherein determining the maximum energy image to represent the fingerprint comprises:
   assigning a real component of the aligned complex image at the maximum energy phase to be the maximum energy image.

8. The method of claim 1, further comprising:
   generating fingerprint image information using the maximum energy image; and
   using the fingerprint image information to authenticate a user with the ultrasonic sensor array.

9. An ultrasonic sensor, comprising:
an ultrasonic transmitter configured to transmit an ultrasonic wave;
a piezoelectric receiver layer configured to receive a reflected wave of the ultrasonic wave, wherein the reflected wave comprises a plurality of images of a fingerprint having a plurality of phases in a time sequence;
a platen layer configured to protect the ultrasonic transmitter and the piezoelectric receiver layer; and
an ultrasonic sensor array and a processor configured to:
sum the plurality of images multiplied by a complex phase exponential to form an integrated complex image;
align the integrated complex image to a pre-selected phase to form an aligned complex image;
determine a maximum energy phase using the aligned complex image; and
compute a maximum energy image to represent the fingerprint based at least in part on the aligned complex image at the maximum energy phase.

10. The ultrasonic sensor of claim 9, wherein the processor is further configured to:
integrate the plurality of images multiplied by the complex phase exponential over time to generate the integrated complex image,
wherein the integrated complex image includes a real image part and an imaginary image part, and wherein the real image part and the imaginary image part have approximately 90 degrees offset in phase.

11. The ultrasonic sensor of claim 9, wherein the processor is further configured to:
convolve the integrated complex image with a complex kernel, wherein the complex kernel is an inverse of a spatial part of an impulse response.

12. The ultrasonic sensor of claim 11, wherein the processor is further configured to:
remove edge effects by performing the convolution using Discrete Cosine Transform.

13. The ultrasonic sensor of claim 9, wherein the processor is further configured to:
compute a derivative of energy of the aligned complex image with respect to phase; and
compute the maximum energy phase by setting the derivative of the energy of the aligned complex image with respect to phase to zero.

14. The ultrasonic sensor of claim 9, wherein the processor is further configured to:
assign a real component of the aligned complex image at the maximum energy phase to be the maximum energy image.

15. The ultrasonic sensor of claim 9, wherein the processor is further configured to:
generate fingerprint image information using the maximum energy image; and
use the fingerprint image information to authenticate a user at the ultrasonic sensor array.

16. The ultrasonic sensor of claim 9, wherein the platen layer is made of at least one of sapphire, gorilla glass, polycarbonate, a polymeric material, or a metal-filled plastic.

17. An ultrasonic sensor, comprising:
means for capturing a plurality of images of a fingerprint having a plurality of phases in a time sequence;
means for summing the plurality of images multiplied by a complex phase exponential to form an integrated complex image;
means for aligning the integrated complex image to a pre-selected phase to form an aligned complex image;
means for determining a maximum energy phase using the aligned complex image; and
means for determining a maximum energy image to represent the fingerprint based at least in part on the aligned complex image at the maximum energy phase.

18. The ultrasonic sensor of claim 17, wherein the means for capturing a plurality of images of a fingerprint comprises:
means for transmitting an ultrasonic wave, wherein the transmitted ultrasonic wave is modeled as a sinusoidal function multiplied by a pulse; and
means for receiving a reflected wave of the ultrasonic wave, wherein the reflected wave comprises the plurality of images of the fingerprint having the plurality of phases in the time sequence.

19. The ultrasonic sensor of claim 17, wherein the means for summing the plurality of images comprises:
means for integrating the plurality of images multiplied by the complex phase exponential over time to generate the integrated complex image,
wherein the integrated complex image includes a real image part and an imaginary image part, and wherein the real image part and the imaginary image part have approximately 90 degrees offset in phase.

20. The ultrasonic sensor of claim 17, wherein the means for aligning the integrated complex image to the pre-selected phase comprises:
means for convolving the integrated complex image with a complex kernel, wherein the complex kernel is an inverse of a spatial part of an impulse response.

21. The ultrasonic sensor of claim 20, further comprising:
means for removing edge effects by performing the convolution using Discrete Cosine Transform.

22. The ultrasonic sensor of claim 17, wherein the means for determining the maximum energy phase comprises:
means for computing a derivative of energy of the aligned complex image with respect to phase; and
means for computing the maximum energy phase by setting the derivative of the energy of the aligned complex image with respect to phase to zero.

23. The ultrasonic sensor of claim 17, wherein the means for determining the maximum energy image to represent the fingerprint comprises:
means for assigning a real component of the aligned complex image at the maximum energy phase to be the maximum energy image.

24. The ultrasonic sensor of claim 17, further comprising:
means for generating fingerprint image information using the maximum energy image; and
means for using the fingerprint image information to authenticate a user with the ultrasonic sensor array.

25. A non-transitory medium storing instructions for execution by one or more processors, the instructions comprising:
instructions for capturing a plurality of images of a fingerprint having a plurality of phases in a time sequence;
instructions for summing the plurality of images multiplied by a complex phase exponential to form an integrated complex image;
instructions for aligning the integrated complex image to a pre-selected phase to form an aligned complex image;
instructions for determining a maximum energy phase using the aligned complex image; and instructions for determining a maximum energy image to represent the fingerprint based at least in part on the aligned complex image at the maximum energy phase.

26. The non-transitory medium of claim 25, wherein the instructions for capturing a plurality of images of a fingerprint comprises:

instructions for transmitting an ultrasonic wave from the ultrasonic transmitter, wherein the transmitted ultrasonic wave is modeled as a sinusoidal function multiplied by a pulse; and instructions for receiving a reflected wave of the ultrasonic wave at the piezoelectric receiver layer, wherein the reflected wave comprises the plurality of images of the fingerprint having the plurality of phases in the time sequence.

27. The non-transitory medium of claim 25, wherein the instructions for summing the plurality of images comprises:

instructions for integrating the plurality of images multiplied by the complex phase exponential over time to generate the integrated complex image, wherein the integrated complex image includes a real image part and an imaginary image part, and wherein the real image part and the imaginary image part have approximately 90 degrees offset in phase.

28. The non-transitory medium of claim 25, wherein the instructions for aligning the integrated complex image to the pre-selected phase comprises:

instructions for convolving the integrated complex image with a complex kernel, wherein the complex kernel is an inverse of a spatial part of an impulse response.

29. The non-transitory medium of claim 25, wherein the instructions for determining the maximum energy phase comprises:

instructions for computing a derivative of energy of the aligned complex image with respect to phase; and instructions for computing the maximum energy phase by setting the derivative of the energy of the aligned complex image with respect to phase to zero.

30. The non-transitory medium of claim 25, wherein the instructions for determining the maximum energy image to represent the fingerprint comprises:

instructions for assigning a real component of the aligned complex image at the maximum energy phase to be the maximum energy image.

\* \* \* \* \*